United States Patent [19]

Gozzano

[11] Patent Number: 4,784,509

[45] Date of Patent: Nov. 15, 1988

[54] DEVICES FOR FIXING SUPPORT, JOINT OR HINGE ELEMENTS TO PANELS OF EXPANDED POLYSTYRENE, OR THE LIKE

[75] Inventor: Renato Gozzano, Milan, Italy

[73] Assignee: Lucifero S.r.l., Milan, Italy

[21] Appl. No.: 893,518

[22] Filed: Aug. 5, 1986

[30] Foreign Application Priority Data

Aug. 5, 1985 [IT] Italy ................................ 21866 A/85

[51] Int. Cl.$^4$ .............................................. F16D 1/00
[52] U.S. Cl. ...................................... 403/24; 403/283; 403/403; 16/225
[58] Field of Search ............... 411/461, 462, 463, 469, 411/478; 403/283, 403, 24; 16/225

[56] References Cited

U.S. PATENT DOCUMENTS

| 78,505 | 6/1868 | Wright | 411/461 X |
|---|---|---|---|
| 3,454,292 | 7/1969 | Sanford | 403/283 |
| 4,318,628 | 3/1982 | Mancini | 411/461 X |

Primary Examiner—Andrew V. Kundrat
Attorney, Agent, or Firm—Millen & White

[57] ABSTRACT

The invention concerns device for removably fixing support, joint or hinge elements to panels or blocks of expanded polystyrene or of similar materials. The method is characterized by providing a pair of plates, each having a face from which protrudes one or more nails or spikes substantially perpendicular to the same face, and by inserting the said plates correspondingly into the faces of the panels or blocks forming an angle to each other so that the nails or spikes of the two plates intermesh. In particular, the plates, once inserted in the polystyrene, are locked together.

12 Claims, 6 Drawing Sheets

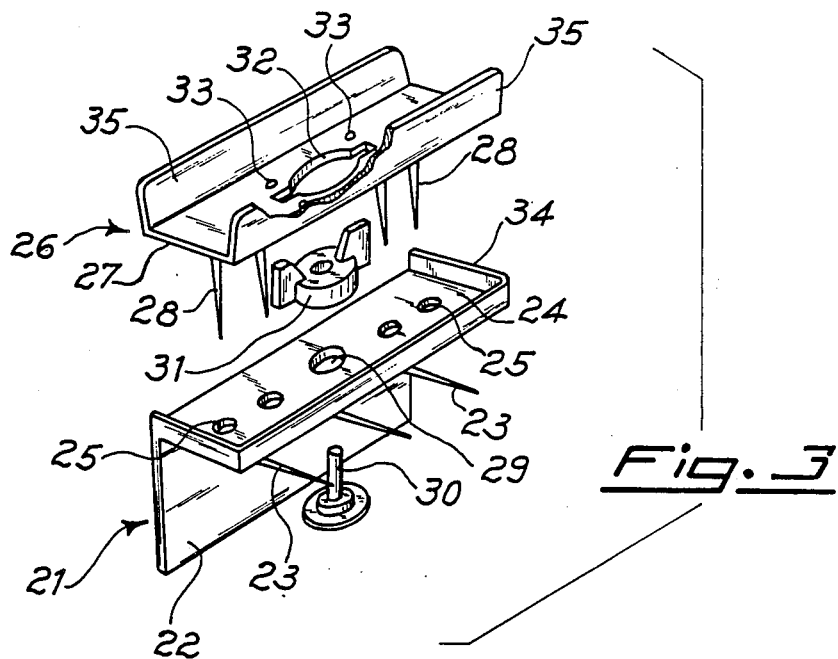
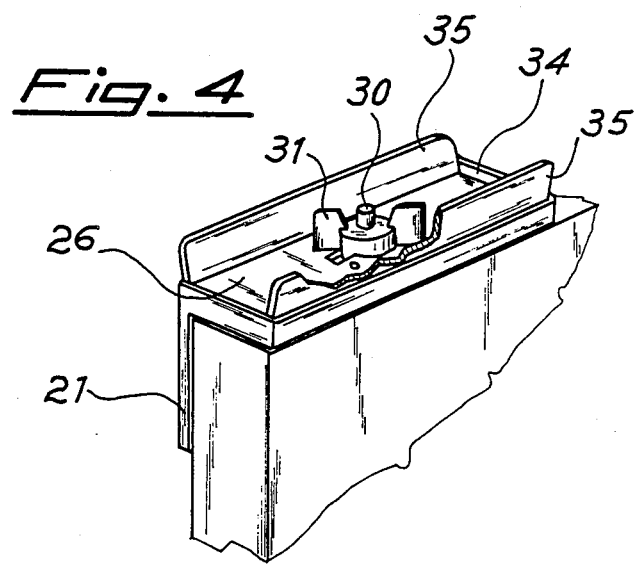

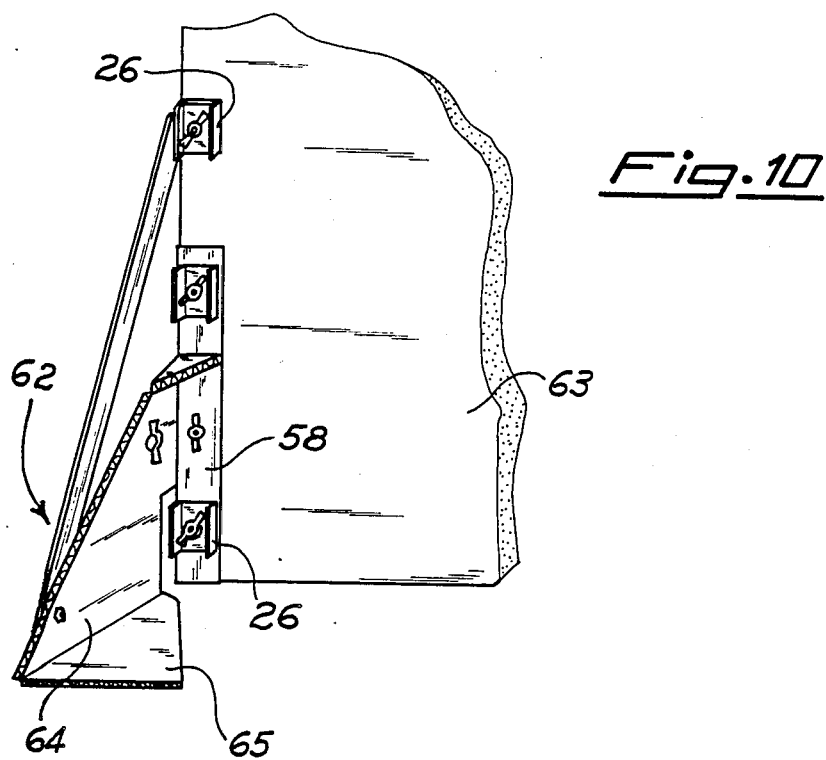
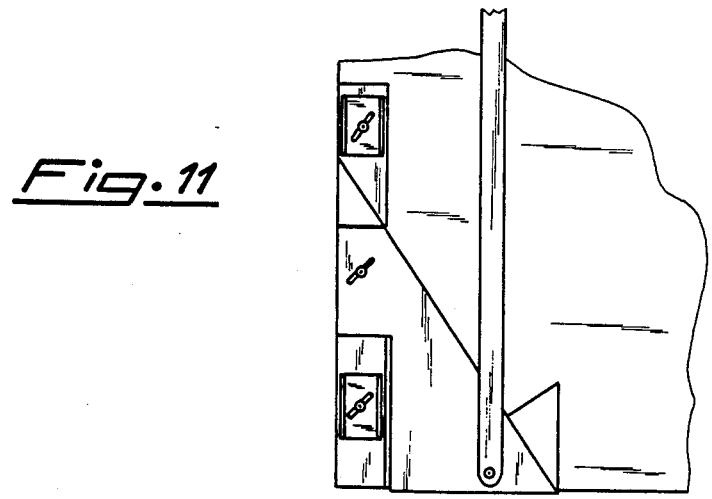

12 4,784,509

DEVICES FOR FIXING SUPPORT, JOINT OR HINGE ELEMENTS TO PANELS OF EXPANDED POLYSTYRENE, OR THE LIKE

BACKGROUND OF THE INVENTION

1. Field of the Invention

The present invention concerns a device for fixing in a removable way support, joint and hinge elements to panels and blocks of expanded polystyrene or similar materials.

2. Description of the Prior Art

As is known, polystyrene panels have a very low density and for this reason are extremely difficult to fix together in removable way. Precisely because of their low density, the panels of expanded polystyrene offer little resistance to penetration of nails or similar fixings which then offer little resistance to their extraction. Further, even quite small loads applied perpendicularly to the nail tend to deform the polystyrene with a consequent reduction of its ability to hold the same nail.

Due to their lightness and ease of handling, and the surface characteristics, expanded polystyrene, especially in panels, is often used in photography to make background walls and light reflecting screens.

One of the problems which the photographer has to solve every time he wants to make a background or reflector with expanded polystyrene is how to fix and support the panels in the desired way.

In general the panels are arranged vertically and often are superimposed upright to form determined angles.

To support the panels in the vertical position the photographer frequently uses small platforms with channels into which the base of the panel is inserted; or the panels are suspended from the ceiling with wires, hooks, etc. To suspend two or more overlapped panels at different angles, tripods are more often used with vertical rods to which are fixed arms, wires or lines to which, in turn, the panels are connected in some way.

The result is always a very complex, unwieldly, unstable construction which is laborious to erect. Furthermore, the panels are rarely ever ideally positioned.

Always because of its surface properties, its lightness and ease of handling, expanded polystyrene, especially in the form of panels, can be advantageously used in shopwindow displays and as trade fair exhibition stands.

These uses of polystyrene panels are, however, limited by the difficulty which users find in trying to fix the panels to the conventional means of support and articulation.

OBJECTS OF THE INVENTION

The main object of the present invention is to provide a device for fixing in a removable way support, joint, and hinge elements to panels of expanded polystyrene, in such a manner to overcome the above mentioned problems.

A further object of this invention is to provide a series of devices which allow rapid fixing together, in a stable way and in any desired position and angle, two or more panels of expanded polystyrene or an equivalent material. Another object aim of the invention is to provide a device for supporting a panel of expanded polystyrene in a vertical or angled position.

SUMMARY OF THE INVENTION

These objects are achieved by the steps of predisposing a pair of plates each having a face from which one or more nails protrude more or less vertically to the same face, and of inserting said plates correspondingly in faces of the panel or block forming an angle to each other, so that the nails of the two plate faces intermesh. In particular, said plates are locked to each other when they are in said inserted position.

The device for carrying-out the method according to the invention is characterized in that it comprises of a pair of plates, each having a face from which protrude perpendicularly one or more nails. In particular, at least one of the plates has means for locking on to the other plate so that the two plates are kept locked together when they are in the inserted position.

Further details and characteristics of the method and device according to the invention are now described with reference to the accompanying drawings illustrating some possible embodiments of the device itself.

BRIEF DESCRIPTION OF THE DRAWINGS

FIG. 3 is a perspective view of a second embodiment of the device with the two plates in reciprocal presentation before they are attached to the panel of polystyrene;

FIG. 4 is a perspective view of the device of the preceding figure attached to the polystyrene panel;

FIG. 10 is a perspective view of the device illustrated in FIG. 9 coupled to a support element and attached to a polystyrene panel;

FIG. 11 is a front view of the device of the preceding figure in the rest position.

DESCRIPTION OF THE PREFERRED EMBODIMENT

Figure 1:
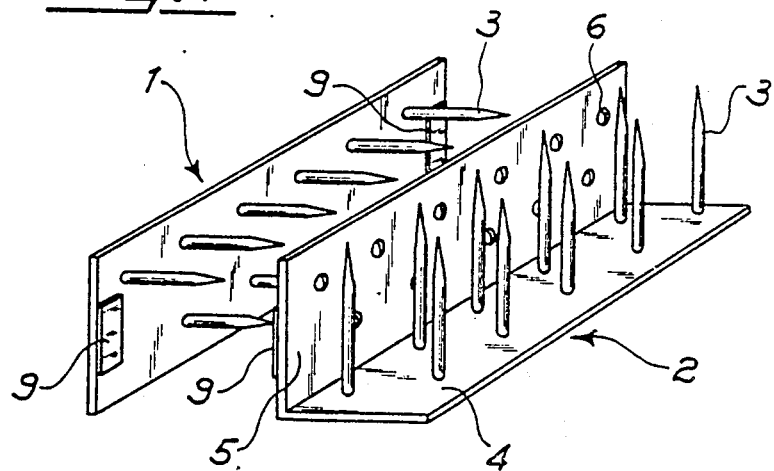
FIG. 1 is a perspective view of a first embodiment of the device with the two plates in position of reciprocal presentation before their attachment to a panel of polystyrene.

With reference first of all to FIG. 1, the device comprises essentially two plate members 1 and 2, of which plate member 2 is bent at right angles so as to have two plates 4 and 5 joined to one another with the plate 5 serving as a flange for plate 4. Both the plates present a number of nails or spikes 3 perpendicular to their faces an arranged in first and second arrays, respectively.

In particular, the spikes of plate 2 protrude from one of the two faces (indicated by 4 in the figure) in such a way as to be turned towards the interior of the angle formed by the latter. The other face 5 of plate 2 presents a number of through holes 6 positioned to coincide with the spikes protruding from plate 1 but not aligned with the array therof.

In this way the spikes of plate 1 can be inserted into the corresponding holes in plate 2 until the two plates mate together with the spikes of plate 1 missing the spikes of plate 2.

Figure 2:
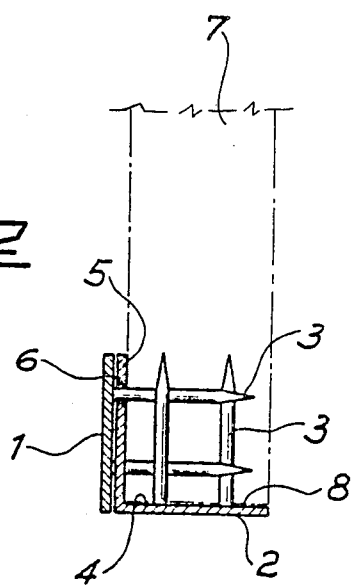
FIG. 2 is a sectional view of the device of the preceding figure attached to the panel of polystyrene.
Figure 5:
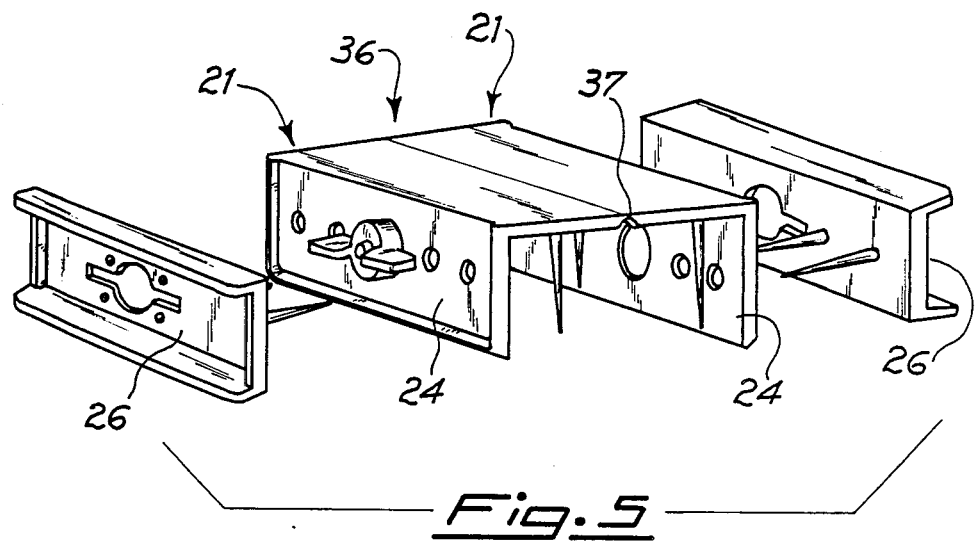
FIG. 5 is a perspective view of a third embodiment of the device with the constituent elements in position of reciprocal presentation before their attachment to a pair of panels of polystyrene.

With reference to FIG. 2, the device is attached to a panel of polystyrene 7 in such a way as the nails 3 penetrate the panel until they bring face 4 into contact with the surface of the panel itself.

In FIG. 2 the plate member 2 is attached to the panel with its face 4 in contact with the lower edge 8 of the panel and with its face 5 in contact with the side of the same panel. Once plate 2 is inserted, plate 1 is inserted into the panel so that the nails 3 pass into holes 6 of plate member 2 until the two plates are in contact. In that the plate member 2 is installed first, it is referred to as the first plate member and, in that the plate 1 is installed second, it is referred to as the second plate member.

The bearing of plate 1 on the vertical face of plate 2 ensures that the plates and the nails are kept perpendicular to each other. In particular, to ensure that the two plates are correctly matched up, there are retainers 9 on the mating faces which could be for example strips of velcro, snap fasteners or the like.

The two faces of plate 2 can be of differing lengths, in particular face 5 could be divided into more angular elements protruding perpendicularly from face 4 which could have one or more centring holes through which are inserted one or more nails from plate 1 or one or more pins or other centring elements protruding from the latter plate.

The device 1 could be used to connect two panels together in line or to attach something to a panel.

In particular, face 4 of plate 2 could be turned at right angles or any other angle to link two panels at an angle to each other.

With reference to FIG. 3, the second embodiment of the device is comprised essentially of a first plate 21 and a face 22 from which protrude perpendicularly a number of long pointed elements 23 and a face or angled elements 24 presenting a number of through holes 25; a second plate 26 presents a face 27 from which protrude perpendicularly a number of long pointed elements 28 so diposed to locate in the holes 25 of the angled element 24 of the first plate 21. Both plates 21 and 26 are in moulded plastic and the related long pointed elements 23 and 28 are in one piece, slightly conical and have-cross shaped or similar cross-section.

The angular element 24 protruding from plate 21 is comprised, apart from the through holes 25, of a through hole 29 which takes a support pin 30 carrying a small wing nut 31. In greater detail, the pin 30 has an enlarged base and is inserted into the hole 29 of the angular element 24 in such a way as to protrude towards the outside of the latter. The wing nut 31 is snap fitted onto the head of the pin 30 and is thus linked to plate 21. The plate 26 has a central through hole 32 so shaped to take the wing nut 31 when the latter is in the horizontal position; in this way when plates 21 and 26 are correctly positioned with the long protruding elements of plate 26 engaged in the holes of plate 21, a halfturn of the wing nut clockwise or anticlockwise will lock the plates together (FIG. 4).

In particular, there are small protruberances around the hole 32 in plate 26 which keep the wing nut 31 in position when the latter has been turned.

The angular element 24 protruding from plate 21 presents a perimeter webbing which strengthens it and ensures correct positioning with respect to plate 21.

The plate 26 presents, in the part opposite the long elements 28, a pair of lugs 35 which facilitate manual fitting together.

The production of the plates as a plastic moulding allows the production of a single structure 36 comprising of two plates 21 hinged together symmetrically so that the elements 24 are opposite each other and protruding in the same direction. The plates 21 are hinged on the edge opposite the angluar element 24 and the hinge 37 consists of a section of plastic which is thinner than that of face 22.

The structure 36 is moulded as a single unit and the plates 21 can be easily separated by cutting the hinge 37 which joins them.

Figure 6:
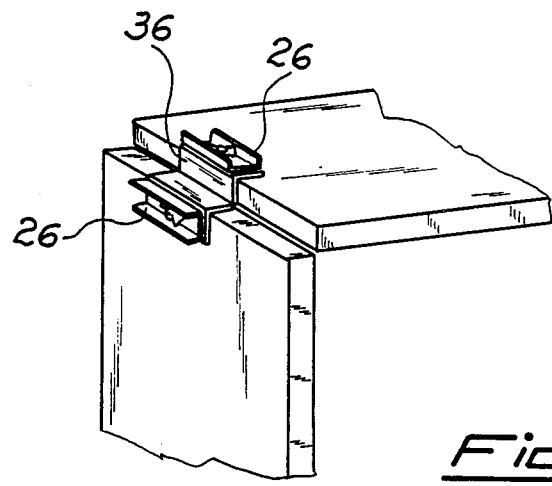
FIG. 6 is a perspective view of the device of the preceding figure attached to a pair of panels of polystyrene.

The structure 36 can be used in combination with plates 26 to hinge together two polystyrene blocks or panels as illustrated in FIG. 6.

Figure 7:
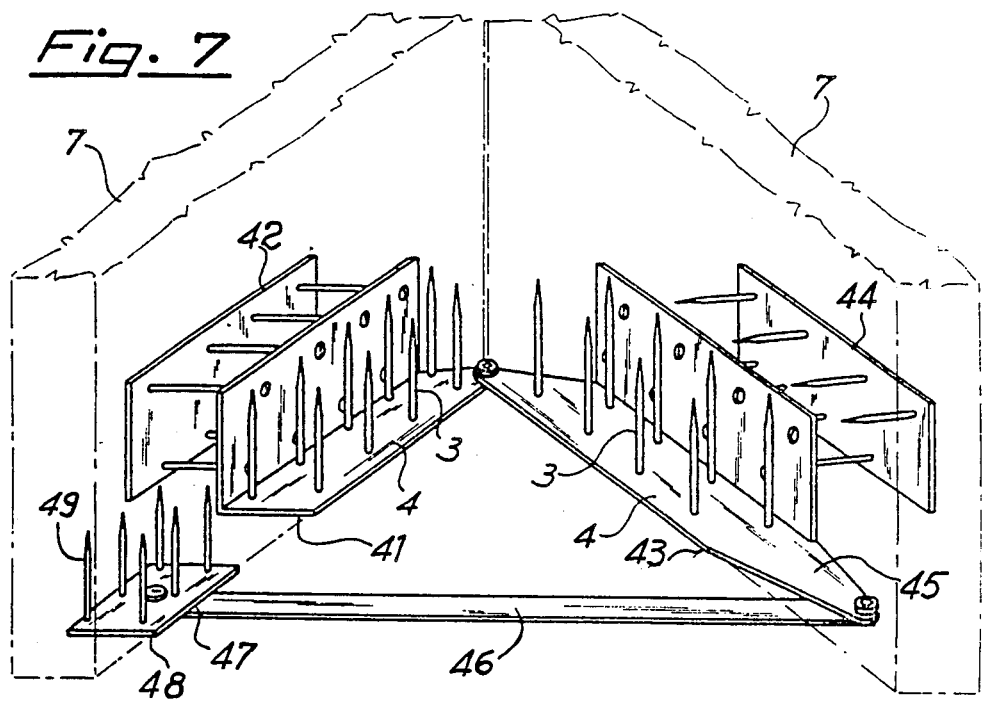
FIG. 7 is a perspective view of a fourth embodiment of the device attached to a panel of polystyrene.

With reference to FIG. 7, the device comprises two pairs of plates 41, 42, 43 and 44 all similar to the pair of plates in FIGS. 1 and 2. The two right angled plates are hinged together at an edge so that the faces 4 carrying the nails 3 rotate in the same plane.

The two pairs of plates are fixed corresponding to the two lower inside edges of two expanded polystyrene panels 7 placed side by side. It should be noted that the two panels, once locked together by the device in FIG. 7, can be stood upright by simply angling them, without any further means of support.

The device can also be used to overlap two panels so that they form a variable angle with each other. In order to keep the panels at the desired angle, to one of the free edges 45 of the two hinged plates 41 and 43 an arm 46 is hinged, rotating in the same plane as the plates 41 and 43. At the free edge 47 of the arm 46 is hinged a plate 48 having one or more nails 49 turned in the same direction as those on the plates 41 and 43. In this way, once the panels 7 are angled as desired, the angle can be maintained by rotating the arm 46 until the plate 48 overhangs the edge 49 of the panel and inserting the nails of the plate into the panel.

Figure 8:
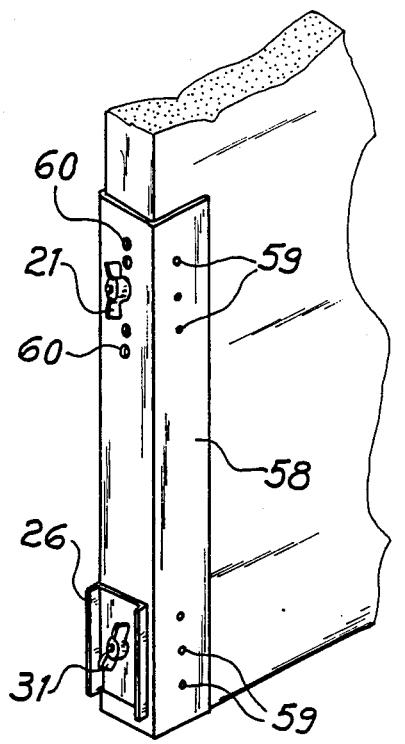
FIG. 8 is a perspective view of a fifth embodiment of the device attached to a panel of polystyrene.

As is illustrrated in FIG. 8, the plate 21 can be substituted by a drawn aluminum section 58 or any other material with the same cross-section and longer length. The drawn section 58 presents a series of long pointed elements 59 (for example, rivets) similar to those 23 presented by plate 21 and a series of through holes 60 to take the long pointed elements 28 protruding from plate 26. The wing nut 31 could easily be attached to the drawn section 58 to fix plate 26 to it. In this way the drawn section 58 can be attached to a panel or block of expanded polystyrene in exactly the same way as plate 21.

Figure 9:
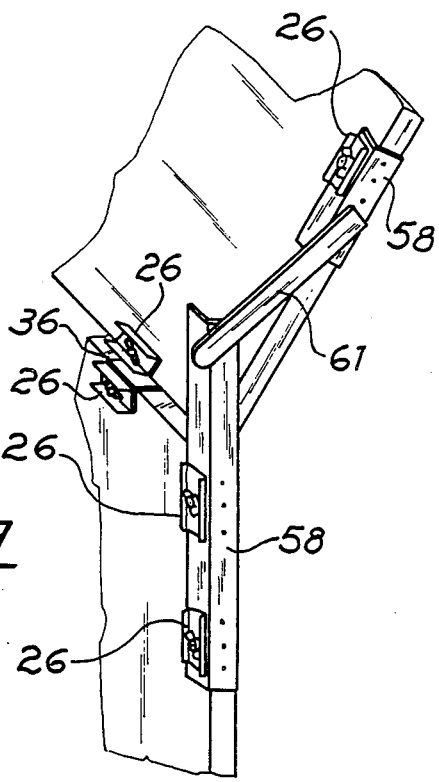
FIG. 9 is an example of use of the devices as shown in FIGS. 5 and 8.

Accessories can be added to the drawn section 58, such as an element 61 to regulate the inclination of two panels hinged together by one or more structures 26 (see FIG. 9), or a support 62 for supporting a panel in the vertical position (see FIG. 10).

The support 62 can be very advantageously made from POLIONDA (registered trade mark) which is an extrusion in PVC composed of a sandwich of two lamina separated by a number of parallel lamine laid side by side. This material can be very easily bent by cutting one of the two lamina parallel to the side by side laminae. In the case illustrated in FIG. 10, a drawn section 58 of aluminum with the same characteristics as that indicated with the same number in FIG. 8, is attached to an expanded polystyrene panel 63 by a pair of plates 26. To the drawn section 58 is attached by rivets, glue, VELCRO or other means, a support 62 comprising a leg 64 and a base 65. Both the leg 64 and the base 65 can be folded as in FIG. 11 for ease of storage of the panel.

I claim:

1. A system for mounting a pair of plate members on a panel having an edge surface and face surface wherein the panel is made of a readily penetrable material such as expanded polystyrene, the system comprising:
   a first plate member having a first array of spikes projecting from a surface thereof;
   a second plate member having a second array of spikes projecting from a surface thereof;
   means for positively securing the first plate member to the second plate member in a position with said surfaces of the first and second plate members substantially normal with respect to one another and with said first and second array of spikes crossing one another;
   the system being mounted on the panel by mounting the first plate member on one of the surfaces of the panel by inserting the first array of spikes into the material thereof, and thereafter mounting the second plate member adjacent the other surface of the panel by inserting the second array of spikes into the material of the panel in a direction substantially perpendicular to that of the spikes of the first array of spikes and in such a manner that the first and second arrays of spikes cross one another and are proximate one another in the material when the first plate member is secured to the second plate member with the securing means.

2. The system of claim 1 wherein one of the plate members has a flange extending therefrom, which flange has an array of openings therein arranged in a selected pattern and wherein the spikes on the other plate are spaced from one another in a pattern corresponding to the pattern of the array of openings.

3. A system according to claim 1, characterized in that at least one of said plate members is molded of plastic, and said spikes are constituted by long pointed elements in one piece protruding from the plate itself.

4. A system according to claim 3, characterized in that said second plate member, corresponding to the opposite edge of the angular element, is a hinged plate member and is in symmetrical position to an identical plate member.

5. A system according to claim 4, characterized in that the two identical plates are a single molding and the joint is formed by a thinning of the material constituting the identical plates along a line parallel to the angular elements.

6. A system according to claim 1, characterized in that the first plate member has a holed face and, linked to the holed face of the plate member, there is a wing nut to be inserted into a corresponding hole in the second plate member to lock the two plate members together, when both are inserted in the panel or block.

7. A system according to claim 6, characterized in that said wing nut is linked to the first plate member by means of a pin with an enlarged base inserted in a hole in the plate member itself and in the wing nut.

8. A system according to claim 3, characterized in that said long pointed elements present a substantially conical shape with a cross-section having the shape of a cross.

9. A system according to claim 4, characterized in that the system comprises two pairs of plate members, two plate members of which are hinged at one edge.

10. A system according to claim 9, characterized in that on one of the hinged plate members, near the edge opposite that hinged to the other plate member, there is a hinged arm to whose free end is hinged a plate member from one of the faces of which protrude one or more spikes.

11. A group of elements adapted in combination with panels of expanded polystyrene for making walls, light reflecting screens, shopwindow dressings, characterized in that it comprises at least one device according to claim 1.

12. A group of elements according to claim 11, characterized in that it comprises a foldable support element formed by a leg attached to said at least one device, as well as a base, such support element being able to maintain at least one panel in a vertical position.

* * * * *